United States Patent
Snyder

(10) Patent No.: US 11,547,094 B1
(45) Date of Patent: Jan. 10, 2023

(54) POULTRY FOUNTAIN AND FEEDING SYSTEM

(71) Applicant: Andy Snyder, Pocatello, ID (US)

(72) Inventor: Andy Snyder, Pocatello, ID (US)

( * ) Notice: Subject to any disclaimer, the term of this patent is extended or adjusted under 35 U.S.C. 154(b) by 270 days.

(21) Appl. No.: 17/020,972

(22) Filed: Sep. 15, 2020

(51) Int. Cl.
    *A01K 5/02*      (2006.01)
    *A01K 7/02*      (2006.01)
    *A01K 39/04*      (2006.01)
    *H05B 45/10*      (2020.01)

(52) U.S. Cl.
CPC .............. *A01K 39/04* (2013.01); *A01K 5/025* (2013.01); *A01K 7/02* (2013.01); *A01K 7/027* (2013.01); *H05B 45/10* (2020.01)

(58) Field of Classification Search
CPC .......... A01K 5/025; A01K 7/02; A01K 7/027; A01K 39/01; A01K 39/02; A01K 39/04
USPC ...... 119/51.11, 51.12, 51.5, 57.92, 61.52, 71
See application file for complete search history.

(56) References Cited

U.S. PATENT DOCUMENTS

| | | | |
|---|---|---|---|
| 1,209,045 A | 12/1916 | Schuh, Jr. | |
| 1,787,703 A | 1/1931 | Rau | |
| 2,519,736 A | 8/1950 | Bradley | |
| 2,671,430 A | 3/1954 | Miller | |
| 3,646,912 A * | 3/1972 | Gardner | A01K 5/0291 119/51.13 |
| 3,874,341 A * | 4/1975 | Riba | A01K 5/0291 119/51.5 |
| 3,942,478 A * | 3/1976 | Lane | A01K 5/0291 119/51.12 |
| 3,985,104 A * | 10/1976 | Klemer | A01K 5/0291 119/51.5 |
| 4,473,031 A * | 9/1984 | Bobeczko | A01K 5/0291 119/51.5 |
| 7,152,550 B2 * | 12/2006 | Walker | A01K 5/0291 119/51.13 |
| 7,159,539 B2 * | 1/2007 | Neckel | A01K 7/00 119/51.01 |
| 7,201,113 B2 * | 4/2007 | Harvey | A01K 7/02 119/72 |
| 7,685,966 B2 * | 3/2010 | Goehring | A01K 5/0114 119/61.5 |
| 7,735,455 B2 | 6/2010 | Clark, Jr. | |
| 8,117,991 B1 * | 2/2012 | Civitillo | A01K 7/027 119/72 |

(Continued)

FOREIGN PATENT DOCUMENTS

CA            505418 A     8/1954

*Primary Examiner* — David J Parsley
(74) *Attorney, Agent, or Firm* — Kyle A. Fletcher, Esq.

(57) ABSTRACT

The poultry fountain and feeding station is a mechanical structure. The poultry fountain and feeding station provides food and water used to feed poultry. The poultry fountain and feeding station comprises a food reservoir, a water reservoir, a control circuit, and a pedestal. The food reservoir, the water reservoir, and the control circuit mount on the pedestal. The pedestal elevates the food reservoir, the water reservoir, and the control circuit above a supporting surface. The food reservoir provides food for the poultry. The water reservoir provides water to the poultry. The control circuit controls access to the food contained in the food reservoir. The control circuit controls the temperature of the water in the water reservoir. The control circuit illuminates the space around the poultry fountain and feeding station.

18 Claims, 7 Drawing Sheets

(56) References Cited

U.S. PATENT DOCUMENTS

| | | | |
|---|---|---|---|
| 8,146,535 B1* | 4/2012 | Neumann | A01K 7/027 |
| | | | 119/72 |
| 8,336,496 B2 | 12/2012 | Reusche | |
| D693,067 S | 11/2013 | Scherbing | |
| 2006/0005776 A1 | 1/2006 | Williams | |
| 2009/0173282 A1* | 7/2009 | Wu | A01K 5/0114 |
| | | | 119/51.02 |
| 2015/0101543 A1* | 4/2015 | Baxter | A01K 5/0142 |
| | | | 119/498 |

* cited by examiner

POULTRY FOUNTAIN AND FEEDING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of animal husbandry and the care of birds, more specifically, a combined feeding and drinking appliance for poultry. (A01K39/04)

SUMMARY OF INVENTION

The poultry fountain and feeding station is a mechanical structure. The poultry fountain and feeding station provides food and water used to feed poultry. The poultry fountain and feeding station comprises a food reservoir, a water reservoir, a control circuit, and a pedestal. The food reservoir, the water reservoir, and the control circuit mount on the pedestal. The pedestal elevates the food reservoir, the water reservoir, and the control circuit above a supporting surface. The food reservoir provides food for the poultry. The water reservoir provides water to the poultry. The control circuit controls access to the food contained in the food reservoir. The control circuit controls the temperature of the water in the water reservoir. The control circuit illuminates the space around the poultry fountain and feeding station.

These together with additional objects, features and advantages of the poultry fountain and feeding station will be readily apparent to those of ordinary skill in the art upon reading the following detailed description of the presently preferred, but nonetheless illustrative, embodiments when taken in conjunction with the accompanying drawings.

In this respect, before explaining the current embodiments of the poultry fountain and feeding station in detail, it is to be understood that the poultry fountain and feeding station is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the poultry fountain and feeding station.

It is therefore important that the claims be regarded as including such equivalent construction insofar as they do not depart from the spirit and scope of the poultry fountain and feeding station. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
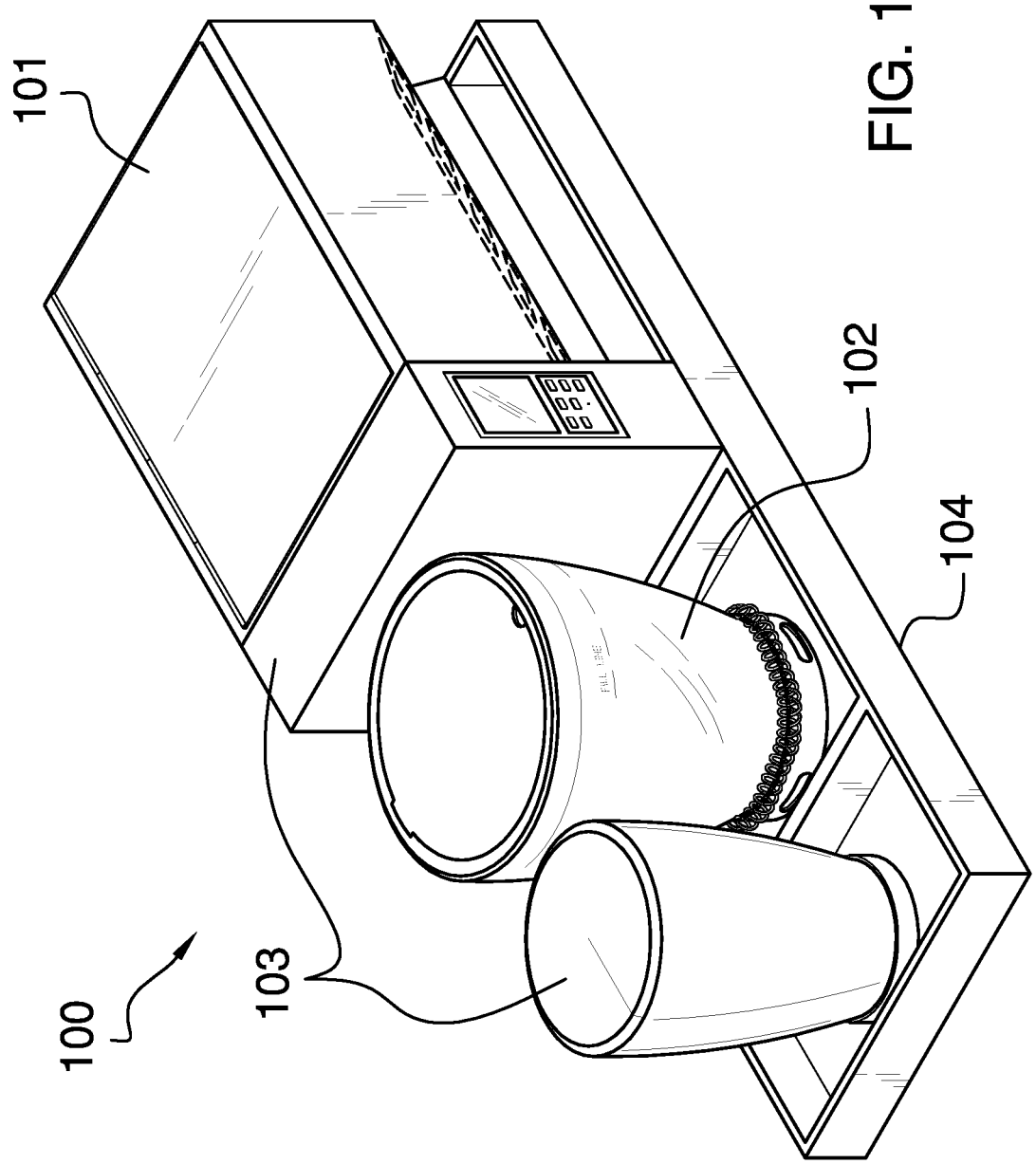
FIG. 1 is a perspective view of an embodiment of the disclosure.
Figure 2:
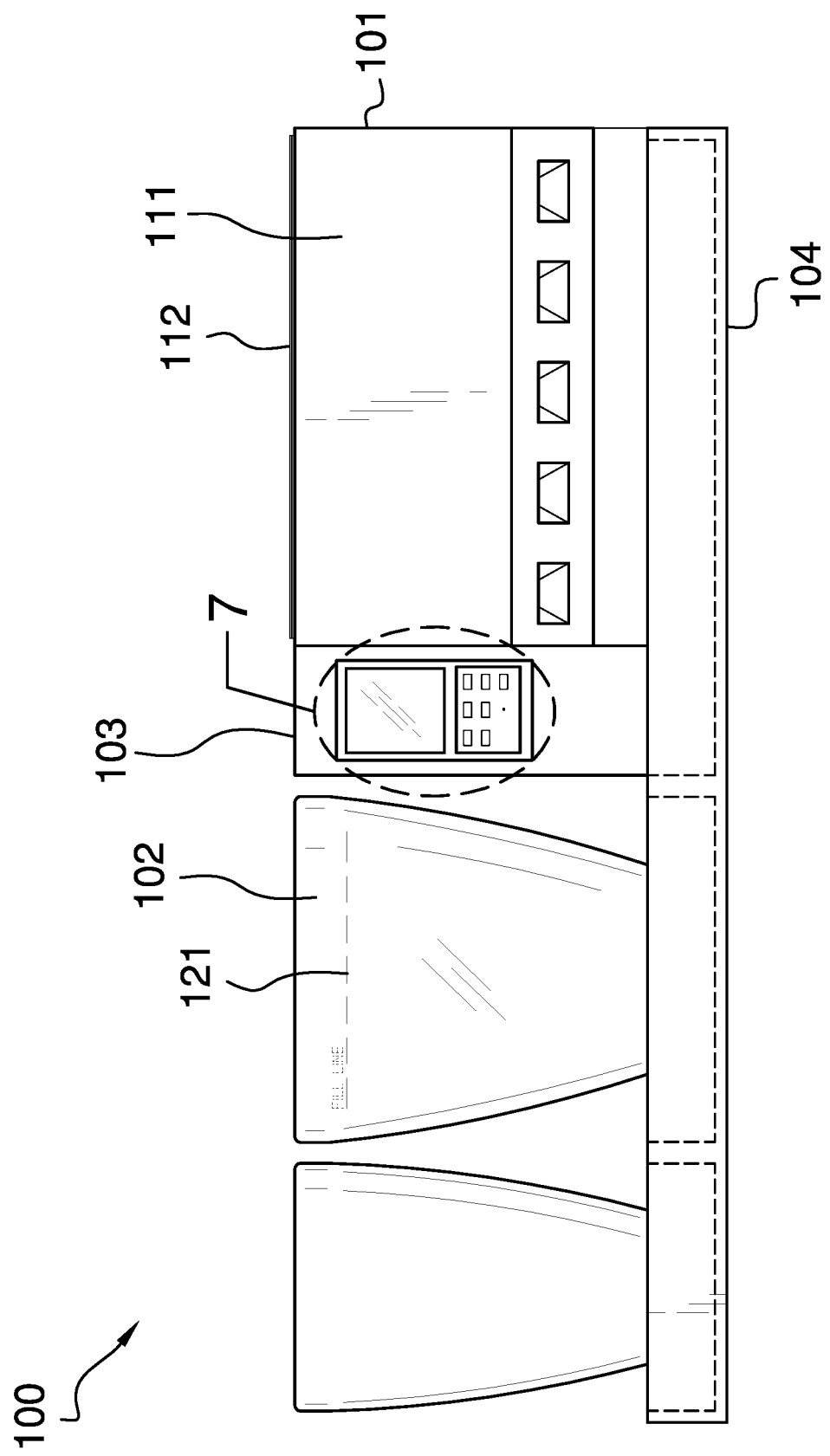
FIG. 2 is a front view of an embodiment of the disclosure.
Figure 3:
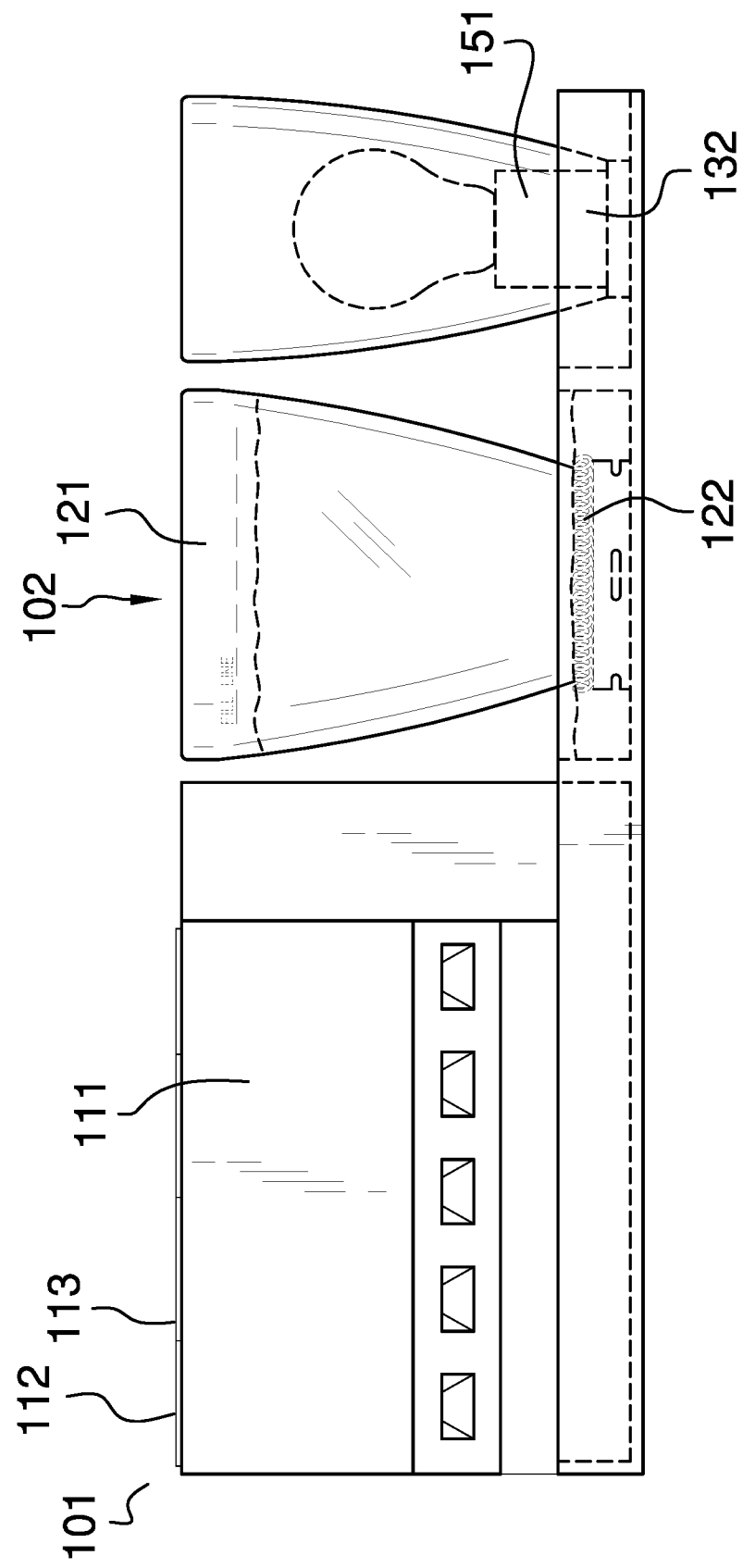
FIG. 3 is a rear view of an embodiment of the disclosure.
Figure 4:
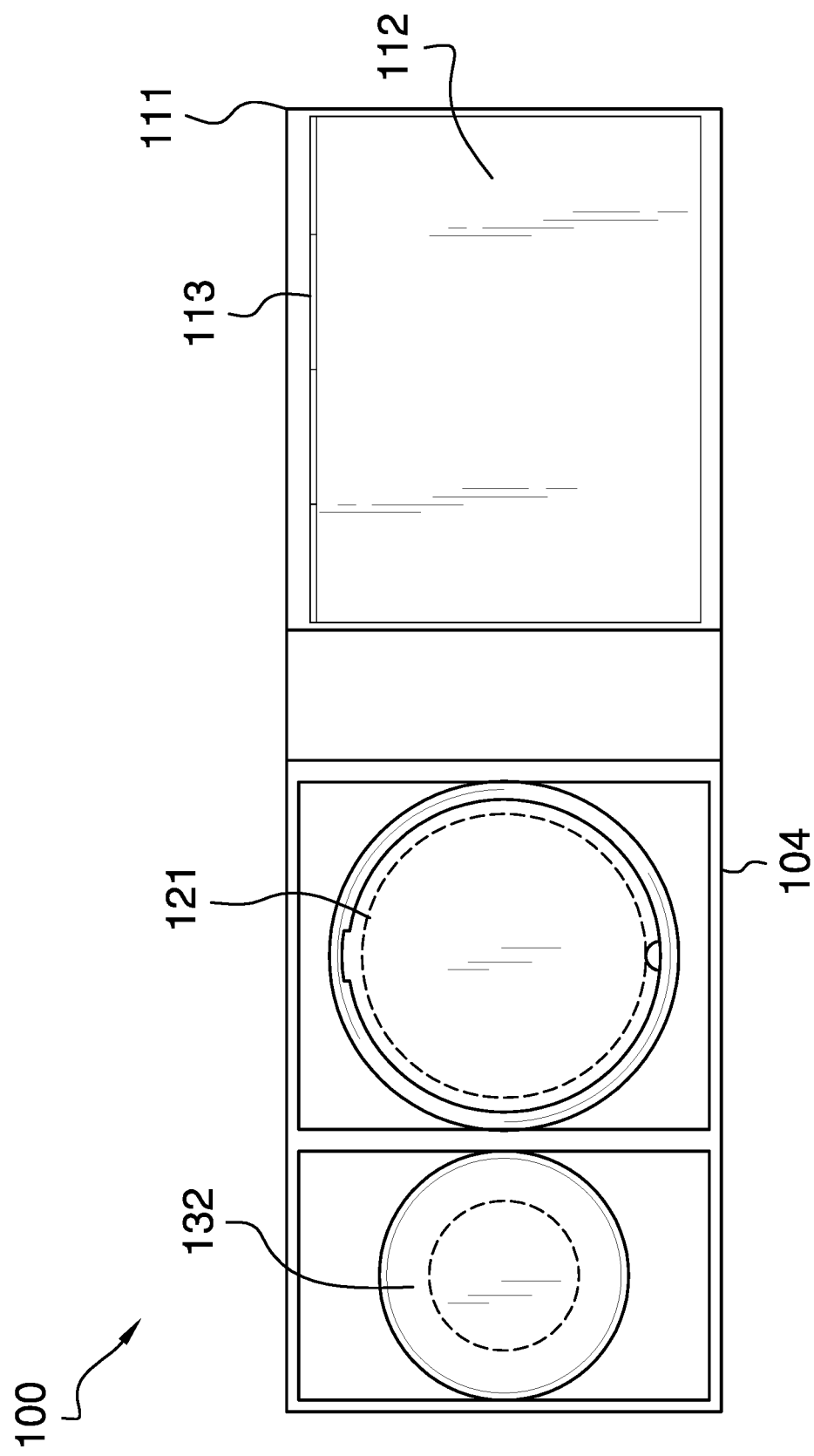
FIG. 4 is a top view of an embodiment of the disclosure.
Figure 6:
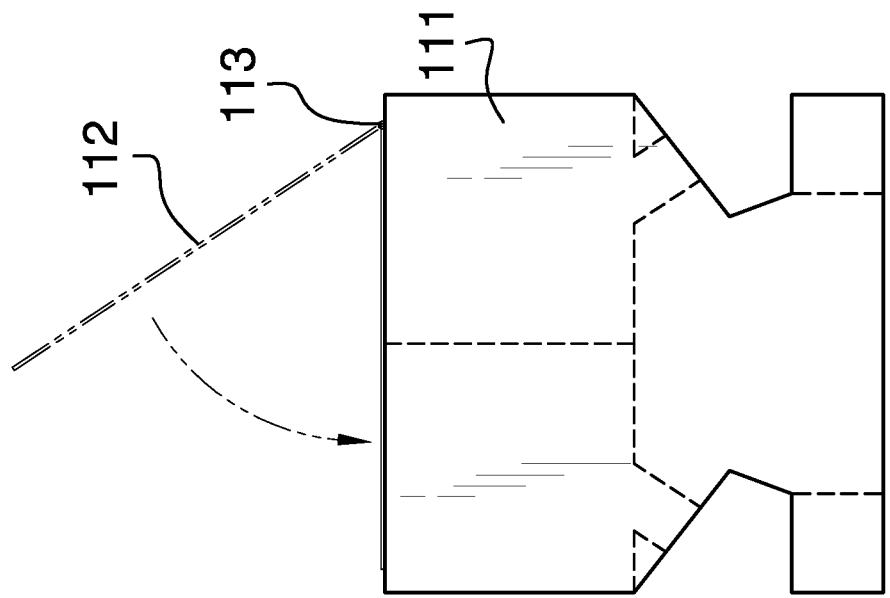
FIG. 6 is a reverse side view of an embodiment of the disclosure.
Figure 5:
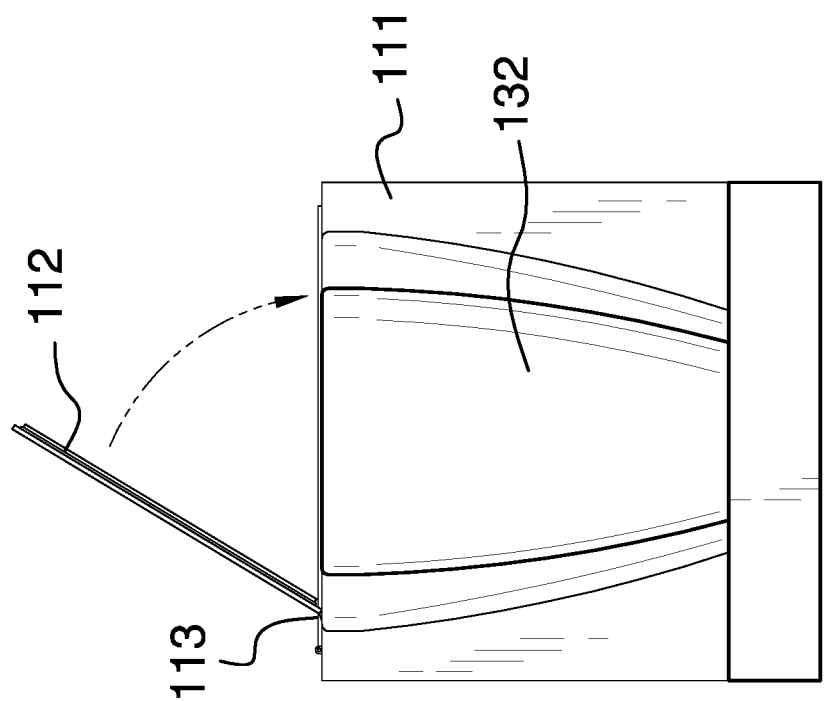
FIG. 5 is a side view of an embodiment of the disclosure.
Figure 7:
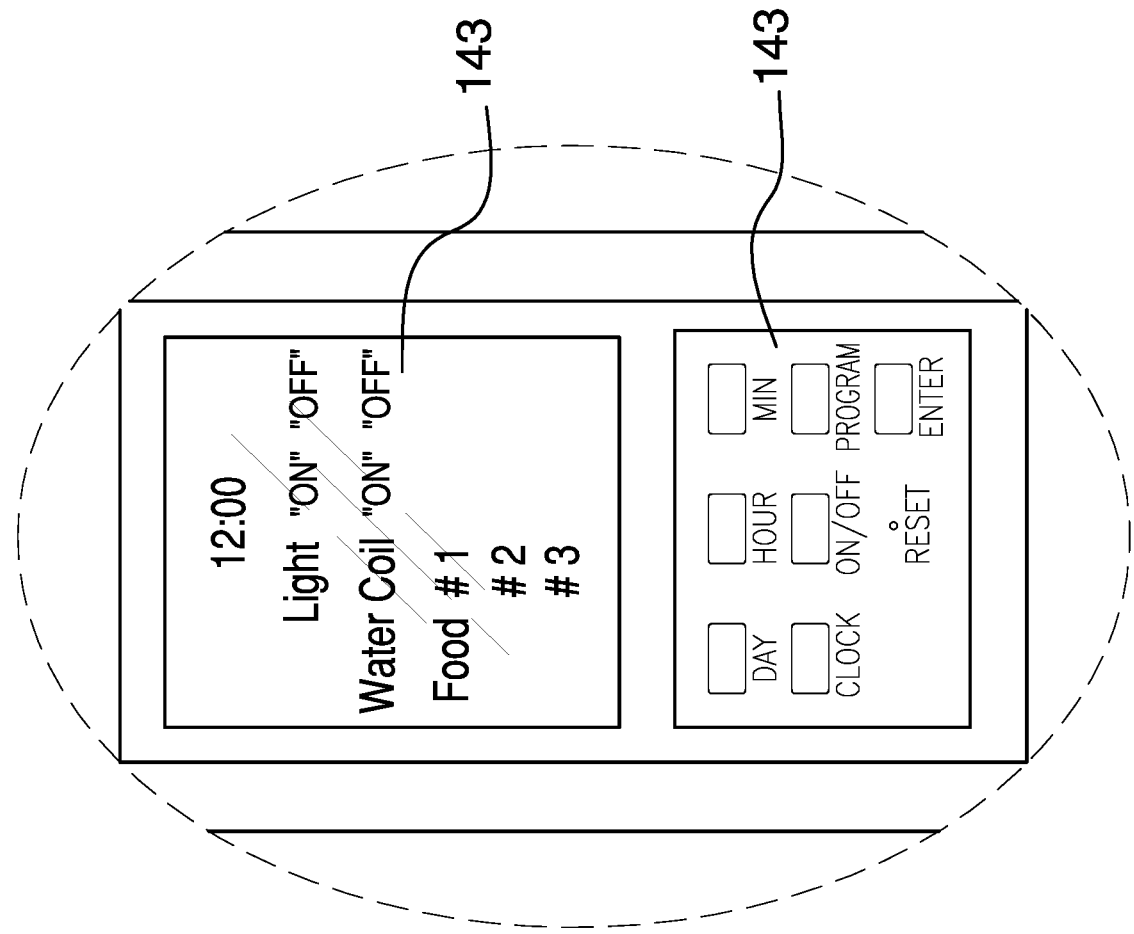
FIG. 7 is a detail view of an embodiment of the disclosure.
Figure 8:
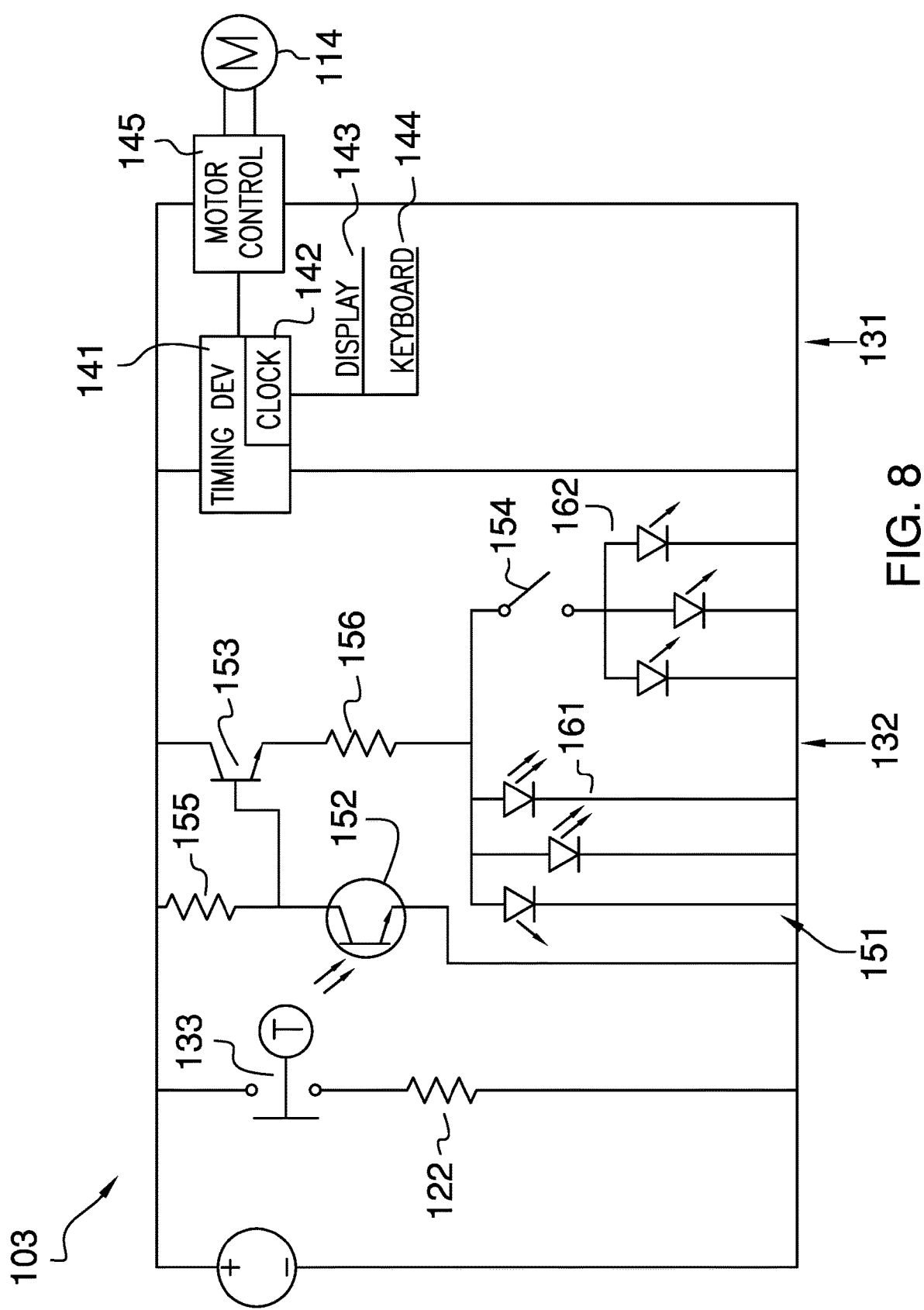
FIG. 8 is a schematic view of an embodiment of the disclosure.

Detailed reference will now be made to one or more potential embodiments of the disclosure, which are illustrated in FIGS. 1 through 8.

The poultry fountain and feeding station 100 (hereinafter invention) is a mechanical structure. The invention 100 provides food and water used to feed poultry. The invention 100 comprises a food reservoir 101, a water reservoir 102, a control circuit 103, and a pedestal 104. The food reservoir 101, the water reservoir 102, and the control circuit 103 mount on the pedestal 104. The pedestal 104 elevates the food reservoir 101, the water reservoir 102, and the control circuit 103 above a supporting surface. The food reservoir 101 provides food for the poultry. The water reservoir 102 provides water to the poultry. The control circuit 103 controls access to the food contained in the food reservoir 101. The control circuit 103 controls the temperature of the water in the water reservoir 102. The control circuit 103 illuminates the space around the invention 100.

The pedestal 104 is a prism-shaped structure. The pedestal 104 is a disk-shaped structure. The pedestal 104 elevates the food reservoir 101, the water reservoir 102, and the control circuit 103 above a supporting surface. The pedestal 104 forms a load path that transfers the loads of the food reservoir 101, the water reservoir 102, and the control circuit 103 to the supporting surface. The pedestal 104 is defined elsewhere in this disclosure.

The food reservoir 101 is a container. The food reservoir 101 stores a food used to feed poultry. The food stored in the food reservoir 101 has a bulk solid form. The control circuit 103 controls the access by the poultry to the food contained in the food reservoir 101. The food reservoir 101 comprises a feed pan 111, a feed lid 112, a feed hinge 113, and a feed motor 114.

The feed pan 111 is a pan. The pan is defined elsewhere in this disclosure. The feed pan 111 forms a container that stores the food consumed by the poultry. The feed pan 111 mounts on the superior surface of the pedestal 104.

The feed lid 112 is the structure that controls access to the interior of the feed pan 111. The feed lid 112 attaches to the feed pan 111 such that the feed lid 112 rotates relative to the feed pan 111. The control circuit 103 controls the rotation of the feed lid 112 relative to the feed pan 111. The feed lid 112 rotates to an open position to provide the poultry access to the food stored within the feed pan 111. The feed lid 112 rotates to a closed position to deny the poultry access to the food stored within the feed pan 111.

The feed hinge 113 is a fastening structure. The feed hinge 113 is a rotating structure. The feed hinge 113 attaches the feed lid 112 to the feed pan 111 such that the feed lid 112 rotates relative to the feed pan 111.

The feed motor 114 is an electric motor. The feed motor 114 provides the motive forces necessary to rotate the feed lid 112 relative to the feed pan 111. The control circuit 103 controls the operation of the feed motor 114. By controlling the operation of the feed motor 114 is meant that the speed of rotation and the direction of rotation of the feed motor 114 is controlled by the control circuit 103.

The water reservoir 102 is a container. The water reservoir 102 contains water that is accessible to the poultry. The water reservoir 102 comprises a water pan 121 and a heating element 122. The water pan 121 is a pan. The pan is defined elsewhere in this disclosure. The water pan 121 forms a container that stores the water consumed by the poultry. The water pan 121 mounts on the superior surface of the pedestal 104. The water pan 121 provides the poultry with continuous access to the water contained in the water pan 121. The heating element 122 is an electrically powered device. The heating element 122 generates heat used to warm the water contained in the water pan 121. The heating element 122 is defined elsewhere in this disclosure. The heating element 122 attaches to the water pan 121. The control circuit 103 controls the operation of the heating element 122 by controlling the flow of electricity through the heating element 122.

The control circuit 103 controls the temperature of the water contained in the water reservoir 102. The control circuit 103 is an electric circuit. The control circuit 103 controls the access by the poultry to the food contained in the food reservoir 101. The control circuit 103 provides access to the poultry at a predetermined time. The control circuit 103 provides access to the poultry at the predetermined time for a predetermined duration of time. The control circuit 103 the predetermined time is selected, and can be changed, by the user. The control circuit 103 the predetermined duration time is selected, and can be changed, by the user. The control circuit 103 heats the water contained in the water reservoir 102. The control circuit 103 maintains the water contained in the water reservoir 102 at a temperature that prevents the water contained in the water reservoir 102 from freezing. The control circuit 103 generates an illumination in the vicinity of the invention 100. The control circuit 103 illuminates the vicinity of the invention 100 in periods of darkness. The level of illumination generated by the control circuit 103 is adjustable.

The control circuit 103 comprises a feed circuit 131, a lamp circuit 132, and a thermostat 133. The feed circuit 131, the lamp circuit 132 and the thermostat 133 are electrically interconnected.

The thermostat 133 is a switching device. The thermostat 133 is defined elsewhere in this disclosure. The thermostat 133 measures the temperature of the water contained in the water pan 121. The thermostat 133 initiates the operation of the heating element 122 when the measured temperature of the water falls below a first previously determined temperature. The thermostat 133 discontinues the operation of the heating element 122 when the measured temperature of the water climbs above a second previously determined temperature. The switching element of the thermostat 133 actuates to a closed position to initiate the operation of the heating element 122. The switching element of the thermostat 133 actuates to an open position to discontinue the operation of the heating element 122.

The feed circuit 131 is an electric circuit. The feed circuit 131 controls the operation of the feed motor 114 of the food reservoir 101. The feed circuit 131 controls the speed of rotation of the feed motor 114. The feed circuit 131 controls the direction of rotation of the feed motor 114. The feed circuit 131 forms a clock 142 that maintains the time for the control circuit 103. The feed circuit 131 forms a timing circuit that measures the predetermined duration of time that the control circuit 103 provides the poultry access to the food contained in the food reservoir 101. The feed circuit 131 provides an interface that allows the exchange of operating information between a user and the control circuit 103. The feed circuit 131 comprises a timing device 141, a clock 142, a display device 143, a keyboard 144, and a motor control sub-circuit 145.

The timing device 141 is a timing circuit. The timing device 141 controls the operation of the feed motor 114. The timing device 141 maintains a clock 142 that is used by the timing device 141 to determine the time. At the previously determined time, the timing device 141 initiates the operation of the feed motor 114 to rotate the feed lid 112 to an open position. The timing device 141 measures the duration of time the feed lid 112 is in the open position. After the previously determined amount of time, the timing device 141 initiates the operation of the feed motor 114 to rotate the feed lid 112 to a closed position. The timing device 141 manages an interface that allows the previously determined time and the previously determined duration of time to be adjusted.

The clock 142 is a timekeeping device that synchronizes the operation of the invention 100 to the scheduled activities of the community that is using the invention 100. The clock 142 is an electric sub-circuit of the timing device 141. The display device 143 is an electric device that visually presents information relevant for the operation and adjustment of the control circuit 103. The keyboard 144 is an electric device that receives operating instructions from a user.

The motor control sub-circuit 145 is an electric circuit. The motor control sub-circuit 145 controls the operation of the feed motor 114 by controlling the flow of electricity through the feed motor 114. The timing device 141 controls the operation of the motor control sub-circuit 145. The motor control sub-circuit 145 controls the speed of rotation of the feed motor 114. The motor control sub-circuit 145 controls the direction of rotation of the feed motor 114.

The timing device 141, the timing circuit, the clock 142, the display device 143, the keyboard 144, and the motor control sub-circuit 145 are defined elsewhere in this disclosure.

The lamp circuit 132 is an electric circuit. The lamp circuit 132 generates an illumination in the vicinity of the invention 100. The lamp circuit 132 illuminates when the lamp circuit 132 detects that the vicinity of the invention 100 is in darkness. The lamp circuit 132 is extinguished when the lamp circuit 132 detects that the vicinity of the invention 100 is adequately illuminated. The level of illumination generated by the lamp circuit 132 is adjustable. The lamp circuit 132 comprises a plurality of LEDs 151, a phototransistor 152, a transistor 153, a supplemental illumination switch 154, a pull-up resistor 155, and a limit resistor 156.

Each of the plurality of LEDs 151 is a diode. The diode is defined elsewhere in this disclosure. Each of the plurality of LEDs 151 is an LED. The LED is defined elsewhere in this disclosure. Each of the plurality of LEDs 151 generates an illumination when an electric current flows through the plurality of LEDs 151. The plurality of LEDs 151 generates the illumination of the lamp circuit 132. The plurality of LEDs 151 further comprises a first sub-plurality of LEDs 161 and a second sub-plurality of LEDs 162.

The first sub-plurality of LEDs 161 is a first subset of LEDs selected from the plurality of LEDs 151. The first sub-plurality of LEDs 161 are electrically wired to always be illuminated when the phototransistor 152 is in darkness. The second sub-plurality of LEDs 162 is a second subset of LEDs selected from the plurality of LEDs 151. The second sub-plurality of LEDs 162 are electrically connected to the supplemental illumination switch 154 such that when the supplemental illumination switch 154 controls the flow of electricity through the second sub-plurality of LEDs 162. The second sub-plurality of LEDs 162 are illuminated when both: a) the phototransistor 152 is in darkness; and, b) the supplemental illumination switch 154 is actuated to the closed position.

The phototransistor 152 operates as a switch. When light is applied to the phototransistor 152, the phototransistor 152 will act like a closed switch allowing current flow from the phototransistor 152 collector to the phototransistor 152 emitter. When a light is removed from the base, the phototransistor 152 will act like an open switch prohibiting current flow from the phototransistor 152 collector to the phototransistor 152 emitter. The phototransistor 152 is defined elsewhere in this disclosure.

The phototransistor 152 controls the operation of the transistor 153. Specifically, the phototransistor 152 routes electric current into the transistor 153 base of the transistor 153 when the phototransistor 152 is in darkness. The phototransistor 152 routes electric current around the transistor 153 base of the transistor 153 when the phototransistor 152 is in light.

The transistor 153 operates as a switch. When a voltage is applied to the transistor 153 base, current will flow into the transistor 153 base and the transistor 153 will act like a closed switch allowing current to flow from the transistor 153 collector to the transistor 153 emitter. When the voltage is removed from the transistor 153 base, the transistor 153 will act like an open switch disrupting current flow from the transistor 153 collector to the transistor 153 emitter. The transistor 153 controls the flow of electricity into the plurality of LEDs 151. When the phototransistor 152 is in darkness, the phototransistor 152 actuates the transistor 153 into a closed switch configuration that allows electric current to flow through the plurality of LEDs 151.

The phototransistor 152 and the transistor 153 are defined elsewhere in this disclosure.

The supplemental illumination switch 154 is an electric switch. The supplemental illumination switch 154 is a maintained switch. The supplemental illumination switch 154 controls the flow of electricity from the limit resistor 156 into the second sub-plurality of LEDs 162. When the supplemental illumination switch 154 is actuated to a closed position, the lamp circuit 132 generates the maximum amount of illumination available from the lamp circuit 132. When the supplemental illumination switch 154 is actuated to a closed position, the lamp circuit 132 generates a lesser amount of illumination.

The pull-up resistor 155 is a resistor that electrically connects between an externally provided source of electricity and the collector of the phototransistor 152. The pull-up resistor 155 limits the flow of electricity through the phototransistor 152.

The limit resistor 156 is a resistor that electrically connects between the emitter of the transistor 153 and the plurality of LEDs 151. The limit resistor 156 limits the flow of electricity through the plurality of LEDs 151.

The following definitions were used in this disclosure:

Alarm: As used in this disclosure, an alarm refers to a signal used to indicate the occurrence of an event.

Alarm Clock: As used in this disclosure, an alarm clock refers to a clock that further generates an alarm at a previously specified time. The alarm clock is commonly used to waken an individual from sleep.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Bulk Solid: As used in this disclosure, a bulk solid is a material that is formed from an accumulation of discrete particles. While the discrete particles of the bulk solid are solid materials, in aggregate the physical performance of bulk solid will exhibit fluid characteristics such as flow or taking the shape of a container.

Clock: As used in this disclosure, a clock is an instrument that measures duration. Clocks are often synchronized to a reference "time" that allows for communities to coordinate the scheduling of activities. Within this disclosure, a watch is considered to be a clock.

Closed Position: As used in this disclosure, a closed position refers to a movable barrier structure that is in an orientation that prevents passage through a port or an aperture. The closed position is often referred to as an object being "closed."

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Container: As used in this disclosure, a container is a structure that forms a protected space used to store and transport an object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

Fluid: As used in this disclosure, a fluid refers to a state of matter wherein the matter is capable of flow and takes the shape of a container it is placed within. The term fluid commonly refers to a liquid or a gas.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Heating Element: As used in this disclosure, a heating element is a resistive wire that is used to convert electrical energy into heat. Common metal combinations used to form heat elements include a combination of nickel and Chromium (typical: 80/20), a combination of iron, chromium and aluminum (typical 70/25/5), a combination of copper, nickel, iron, and manganese (typical 66/30/2/2) (use for continuously hot), and platinum.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Keyboard: As used in this disclosure, a keyboard is a panel that further comprises a plurality of buttons that are commonly referred to as keys. The keyboard is commonly used to operate devices including, but not limited to, logical devices and musical instruments.

LED: As used in this disclosure, an LED is an acronym for a light emitting diode. A light emitting diode is a diode that is also a light source.

Lid: As used in this disclosure, a lid is a removable cover that is placed over an opening of a hollow structure to enclose the hollow structure.

Liquid: As used in this disclosure, a liquid refers to a state (phase) of matter that is fluid and that maintains, for a given pressure, a fixed volume that is independent of the volume of the container.

Limit Resistor: As used in this disclosure, a limit resistor is an electrical resistor that is used to limit the flow of electric current through an electrical circuit.

Maintained Switch: A used in this disclosure, a maintained switch is a switch that maintains the position that was set in the most recent switch actuation. A maintained switch works in an opposite manner to a momentary switch.

Motor: As used in this disclosure, a motor refers to the method of transferring energy from an external power source into rotational mechanical energy.

Motor Controller: As used in this disclosure, a motor controller is an electrical device that is used to control the rotational speed, or simply the speed of the motor, and the direction of rotation of an electric motor. Motor controllers will generally receive one or more inputs which are used determine the desired rotational speed and direction of rotation of the electric motor.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Pedestal: As used in this disclosure, a pedestal is an intermediary load bearing structure that that forms a load path between a supporting surface and an object, structure, or load.

Phase: As used in this disclosure, phase refers to the state of the form of matter. The common states of matter are solid, liquid, gas, and plasma.

Phototransistor: As used in this disclosure, a phototransistor is a two terminal photoelectric device that performs in the manner of a transistor within an electrical circuit. Specifically, when exposed to light a phototransistor will behave as a transistor with a voltage applied to the base that creates a base current flow into the transistor.

Pivot: As used in this disclosure, a pivot is a rod or shaft around which an object rotates or swings.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a space formed by a boundary structure. The boundary structure forms a barrier that protects objects within the protected space from potential dangers from the other side of the boundary.

Reservoir: As used in this disclosure, a reservoir refers to a container or containment system that is configured to store a liquid.

Resistance: As used in this disclosure, resistance refers to the opposition provided by an electrical circuit (or circuit element) to the electrical current created by a DC voltage is presented across the electrical circuit (or circuit element). The term impedance is often used for resistance when referring to an AC voltage that is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Solid: As used in this disclosure, a solid refers to a state (phase) of matter that: 1) has a fixed volume; and, 2) does not flow.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Thermostat: As used in this disclosure, a thermostat is a device that monitors the temperature of a space such that the thermostat 1) operates a switch when the measured temperature exceeds or falls below a first preset temperature; and, 2) performs the opposite operation on the switch when the measured temperature falls below or exceeds a second preset temperature. The thermostat is well-known and documented in the electrical arts.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Timing Device: As used in this disclosure, a timing device is an automatic mechanism for activating or deactivating a device at a specific time or after a specific period of time. This disclosure assumes that the logic module is provisioned with a timing circuit that can be used as a timing device. A timing device that activates an audible alarm is often referred to as a timer.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A poultry fountain and feeding station comprising
a food reservoir, a water reservoir, a control circuit, and a pedestal;
wherein the food reservoir, the water reservoir, and the control circuit mount on the pedestal;
wherein the pedestal elevates the food reservoir, the water reservoir, and the control circuit above a supporting surface;
wherein the poultry fountain and feeding station is a mechanical structure;
wherein the poultry fountain and feeding station provides food and water to poultry;
wherein the lamp circuit comprises a plurality of LEDs, a phototransistor, a transistor, a supplemental illumination switch, a pull-up resistor, and a limit resistor;
wherein each of the plurality of LEDs is a diode;
wherein each of the plurality of LEDs is an LED;

wherein each of the plurality of LEDs generates an illumination when an electric current flows through the plurality of LEDs;
wherein the plurality of LEDs generates the illumination of the lamp circuit;
wherein the plurality of LEDs further comprises a first sub-plurality of LEDs and a second sub-plurality of LEDs;
wherein the first sub-plurality of LEDs is a first subset of LEDs selected from the plurality of LEDs;
wherein the first sub-plurality of LEDs are electrically wired to always be illuminated when the phototransistor is in darkness;
wherein the second sub-plurality of LEDs is a second subset of LEDs selected from the plurality of LEDs;
wherein the second sub-plurality of LEDs are electrically connected to the supplemental illumination switch such that the supplemental illumination switch controls the flow of electricity through the second sub-plurality of LEDs;
wherein the second sub-plurality of LEDs are illuminated when both: a) the phototransistor is in darkness; and, b) the supplemental illumination switch is actuated to a closed position;
wherein the phototransistor operates as a switch;
wherein when light is applied to the phototransistor, the phototransistor will act like a closed switch allowing current flow from a phototransistor collector to a phototransistor emitter;
wherein when a light is removed from a base, the phototransistor will act like an open switch prohibiting current flow from the phototransistor collector to the phototransistor emitter;
wherein the phototransistor controls the operation of the transistor;
wherein the phototransistor routes electric current around a transistor base of the transistor when the phototransistor is in light;
wherein the transistor operates as a switch;
wherein the transistor controls the flow of electricity into the plurality of LEDs;
wherein when the phototransistor is in darkness, the phototransistor actuates the transistor into a closed switch configuration that allows electric current to flow through the plurality of LEDs;
wherein the supplemental illumination switch is an electric switch;
wherein the supplemental illumination switch is a maintained switch;
wherein the supplemental illumination switch controls the flow of electricity from the limit resistor into the second sub-plurality of LEDs;
wherein when the supplemental illumination switch is actuated to a closed position, the lamp circuit generates the maximum amount of illumination available from the lamp circuit;
wherein when the supplemental illumination switch is actuated to a closed position, the lamp circuit generates a lesser amount of illumination;
wherein the pull-up resistor is a resistor that electrically connects between an externally provided source of electricity and the collector of the phototransistor;
wherein the pull-up resistor limits the flow of electricity through the phototransistor;
wherein the limit resistor is a resistor that electrically connects between the emitter of the transistor and the plurality of LEDs;
wherein the limit resistor limits the flow of electricity through the plurality of LEDs.

2. The poultry fountain and feeding station according to claim 1 wherein the food reservoir provides food for the poultry;
wherein the water reservoir provides water to the poultry;
wherein the control circuit controls access to the food contained in the food reservoir;
wherein the control circuit controls the temperature of the water in the water reservoir;
wherein the control circuit illuminates the space around the poultry fountain and feeding station.

3. The poultry fountain and feeding station according to claim 2
wherein the pedestal elevates the food reservoir, the water reservoir, and the control circuit above a supporting surface;
wherein the pedestal forms a load path that transfers the loads of the food reservoir, the water reservoir, and the control circuit to the supporting surface.

4. The poultry fountain and feeding station according to claim 3
wherein the food reservoir is a container;
wherein the food reservoir stores a food used to feed poultry;
wherein the food stored in the food reservoir has a bulk solid form;
wherein the control circuit controls the access by the poultry to the food contained in the food reservoir.

5. The poultry fountain and feeding station according to claim 4
wherein the water reservoir is a container;
wherein the water reservoir contains water that is accessible to the poultry.

6. The poultry fountain and feeding station according to claim 5
wherein the control circuit is an electric circuit;
wherein the control circuit controls the temperature of the water contained in the water reservoir;
wherein the control circuit is an electric circuit;
wherein the control circuit is configured to provide the poultry access to the food container in the food reservoir at a predetermined time as well as for a predetermined duration of time;
wherein the control circuit heats the water contained in the water reservoir;
wherein the control circuit maintains the water contained in the water reservoir at a temperature that prevents the water contained in the water reservoir from freezing;
wherein the control circuit generates an illumination in the vicinity of the poultry fountain and feeding station;
wherein the control circuit illuminates the vicinity of the poultry fountain and feeding station in periods of darkness;
wherein the level of illumination generated by the control circuit is adjustable.

7. The poultry fountain and feeding station according to claim 6
wherein the food reservoir comprises a feed pan, a feed lid, a feed hinge, and a feed motor;
wherein the feed hinge attaches the feed lid to the feed pan;
wherein the feed motor rotates the feed lid relative to the feed pan.

8. The poultry fountain and feeding station according to claim 7 wherein the water reservoir comprises a water pan and a heating element;
wherein the heating element attaches to the water pan.

9. The poultry fountain and feeding station according to claim 8
wherein the control circuit comprises a feed circuit, a lamp circuit, and a thermostat;
wherein the feed circuit, the lamp circuit, and the thermostat are electrically interconnected.

10. The poultry fountain and feeding station according to claim 9
wherein the feed pan is a pan;
wherein the feed pan forms a container that stores the food consumed by the poultry;
wherein the feed pan mounts on a superior surface of the pedestal;
wherein the feed lid is the structure that controls access to the interior of the feed pan;
wherein the feed lid attaches to the feed pan such that the feed lid rotates relative to the feed pan;
wherein the control circuit controls the rotation of the feed lid relative to the feed pan;
wherein the feed lid rotates to an open position to provide the poultry access to the food stored within the feed pan;
wherein the feed lid rotates to a closed position to deny the poultry access to the food stored within the feed pan;
wherein the feed hinge is a fastening structure;
wherein the feed hinge is a rotating structure;
wherein the feed hinge attaches the feed lid to the feed pan such that the feed lid rotates relative to the feed pan.

11. The poultry fountain and feeding station according to claim 10
wherein the feed motor is an electric motor;
wherein the feed motor provides the motive forces necessary to rotate the feed lid relative to the feed pan;
wherein the control circuit controls the operation of the feed motor;
wherein by controlling the operation of the feed motor is meant that the speed of rotation and the direction of rotation of the feed motor is controlled by the control circuit.

12. The poultry fountain and feeding station according to claim 11
wherein the water pan is a pan;
wherein the water pan forms a container that stores the water consumed by the poultry;
wherein the water pan mounts on the superior surface of the pedestal;
wherein the water pan provides the poultry with continuous access to the water contained in the water pan.

13. The poultry fountain and feeding station according to claim 12
wherein the heating element is an electrically powered device;
wherein the heating element generates heat used to warm the water contained in the water pan;
wherein the control circuit controls the operation of the heating element by controlling the flow of electricity through the heating element.

14. The poultry fountain and feeding station according to claim 13
wherein the thermostat is a switching device;
wherein the thermostat measures the temperature of the water contained in the water pan;
wherein the switching element of the thermostat actuates to a closed position to initiate the operation of the heating element;
wherein the switching element of the thermostat actuates to an open position to discontinue the operation of the heating element.

15. The poultry fountain and feeding station according to claim 14
wherein the feed circuit is an electric circuit;
wherein the feed circuit controls the operation of the feed motor of the food reservoir;
wherein the feed circuit controls the speed of rotation of the feed motor;
wherein the feed circuit controls the direction of rotation of the feed motor;
wherein the feed circuit forms a clock that maintains the time for the control circuit;
wherein the feed circuit forms a timing circuit that measures the predetermined duration of time that the control circuit provides the poultry access to the food contained in the food reservoir;
wherein the feed circuit provides an interface that allows the exchange of operating information between a user and the control circuit.

16. The poultry fountain and feeding station according to claim 15
wherein the lamp circuit is an electric circuit;
wherein the lamp circuit generates an illumination in the vicinity of the poultry fountain and feeding station;
wherein the lamp circuit illuminates when the lamp circuit detects that the vicinity of the poultry fountain and feeding station is in darkness;
wherein the lamp circuit is extinguished when the lamp circuit detects that the vicinity of the poultry fountain and feeding station is adequately illuminated;
wherein the level of illumination generated by the lamp circuit is adjustable.

17. The poultry fountain and feeding station according to claim 16
wherein the feed circuit comprises a timing device, a clock, a display device, a keyboard, and a motor control sub-circuit;
wherein the timing device is a timing circuit;
wherein the timing device controls the operation of the feed motor;
wherein the timing device maintains a clock that is used by the timing device to determine the time;
wherein the timing device measures the duration of time the feed lid is in the open position;
wherein the clock is a timekeeping device that synchronizes the operation of the poultry fountain and feeding station to the scheduled activities of the community that is using the poultry fountain and feeding station;
wherein the clock is an electric sub-circuit of the timing device;
wherein the display device is an electric device that visually presents information relevant for the operation and adjustment of the control circuit;
wherein the keyboard is an electric device that receives operating instructions from a user;
wherein the motor control sub-circuit is an electric circuit;
wherein the motor control sub-circuit controls the operation of the feed motor by controlling the flow of electricity through the feed motor;
wherein the timing device controls the operation of the motor control sub-circuit;

wherein the motor control sub-circuit controls the speed of rotation of the feed motor;

wherein the motor control sub-circuit controls the direction of rotation of the feed motor.

18. The poultry fountain and feeding station according to claim 17 wherein at the previously determined time, the timing device initiates the operation of the feed motor to rotate the feed lid to an open position;

wherein after the previously determined amount of time, the timing device initiates the operation of the feed motor to rotate the feed lid to a closed position;

wherein the timing device manages an interface that allows the previously determined time and the previously determined duration of time to be adjusted.

* * * * *